United States Patent [19]

Imamura et al.

[11] Patent Number: 5,144,337
[45] Date of Patent: Sep. 1, 1992

[54] IMAGE FORMING APPARATUS CAPABLE OF FORMING AN IMAGE BY DOTS HAVING VARIOUS DIAMETERS

[75] Inventors: Tomoatsu Imamura, Isehara; Masumi Sato, Yokohama; Tomonori Tanaka, Yokohama; Takamasa Hayashi, Yokohama; Toshitaka Senma, Yokohama, all of Japan

[73] Assignee: Ricoh Company, Ltd., Tokyo, Japan

[21] Appl. No.: 594,024

[22] Filed: Oct. 9, 1990

[30] Foreign Application Priority Data

Oct. 12, 1989 [JP] Japan ................................ 1-263931

[51] Int. Cl.⁵ .............................................. H04N 1/21
[52] U.S. Cl. ..................................... 346/108; 358/298
[58] Field of Search ................ 346/108, 160; 358/298, 358/296, 300, 302

[56] References Cited

U.S. PATENT DOCUMENTS 4,307,408 12/1981 Kiyohara et al. .................. 346/108
4,905,023 2/1990 Suzuki ................................ 346/108

Primary Examiner—Mark J. Reinhart
Attorney, Agent, or Firm—Oblon, Spivak, McClelland, Maier & Neustadt

[57] ABSTRACT

An image forming apparatus capable of changing the diameter of a dot in the main and subscanning directions to form various kinds of dots and thereby high resolution images with tones. A data converting circuit separates input image data into pulse width modulation data and power modulation data and distributes them to a pulse width modulating circuit and a power modulating circuit. The pulse width modulating circuit changes the duration of a laser beam issuing from a laser diode to change the diameter of a dot in the main scanning direction. The power modulating circuit changes the exposing energy of the laser beam per unit area and unit time in order to change the dot diameter in the subscanning direction. The modulating circuits control an image writing device in cooperation so as to produce a high resolution image with tones.

5 Claims, 8 Drawing Sheets

EMISSION PULSE AXIS

IMAGE FORMING APPARATUS CAPABLE OF FORMING AN IMAGE BY DOTS HAVING VARIOUS DIAMETERS

BACKGROUND OF THE INVENTION

The present invention relates to an electrophotographic image forming apparatus for forming a latent image electrostatically on a charged image carrier by irradiating it with a light beam, developing the latent image, transferring the developed image to a recording medium and then fixing the image on the medium. More particularly, the present invention is concerned with an image forming apparatus for forming dots or pixels having a basic diameter and dots or pixels having diameters greater than the basic diameter by using a single light beam, and forming a high resolution image with tones by such dots.

In an electrophotographic copier, facsimile transceiver, laser beam printer or similar electrophotographic image forming apparatus, use is made of a semiconductor laser for digitally reproducing the tones of an image. Specifically, a laser beam issuing from a semiconductor laser is easy to modulate with respect to pulse width. It is a common practice, therefore, to form dots having desired diameters and areas and thereby a high resolution image with tones by subjecting the laser beam to pulse width modulation. Such a pulse width modulation scheme is suitable for, among others, the reproduction of tones of a color image.

An image forming apparatus of the type described has an image carrier implemented as a photoconductive element. Generally, the sensitivity and residual potential of a photoconductive element tends to vary with the ambient conditions such as temperature and humidity and due to aging. Likewise, a developer, or toner, for developing a latent image formed on the photoconductive element has the amount of charge and other similar factors thereof varied due to the varying ambient conditions and aging. It is therefore difficult to produce a high resolution image with tones stably over a long period of time. Further, when an image whose density is 600 dots per inch is to be formed by dots whose diameter is smaller than about 42 microns, it is difficult to achieve a high resolution image since the toner does not always deposit on the latent image in proportion to the area exposed by the laser beam. This, of course, depends on the particle size of the toner (about 10 microns) as well. Another factor that degrades the tones of a reproduction and particular to the pulse width modulation system is banding. Specifically, when the distance between nearby dots, i.e., the pulse interval of the fundamental clock is reduced to enhance the resolution of an image with tones, banding is likely to occur due to irregular writing in the subscanning direction.

SUMMARY OF THE INVENTION

It is therefore an object of the present invention to provide an image forming apparatus which insures a high resolution image with tones.

It is another object of the present invention to provide an image forming apparatus which produces a high resolution image with tones by changing the dot diameter in both of the main and subscanning directions and thereby forming various kinds of dots.

It is another object of the present invention to provide a generally improved image forming apparatus.

An image forming apparatus capable of forming an image by dots having various diameters of the present invention comprises an image carrier for forming a latent image thereon, an optical writing device for scanning the image carrier with a light beam to form the latent image, a data converting circuit for separating image data fed thereto from the outside into first data and second data, a first changing circuit for generating, in response to the first data, a first output for changing the duration of the light beam issuing from the optical writing device and irradiating the image carrier in order to change a diameter of a dot mainly in the main scanning direction, and a second changing circuit for generating, in response to the second data, a second output for changing an intensity of the light beam issuing from the optical writing device in order to change the diameter of a dot mainly in the subscanning direction.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

A preferred embodiment of the image forming apparatus in accordance with the present invention will be described which is implemented as a laser beam printer by way of example.

Figure 1:
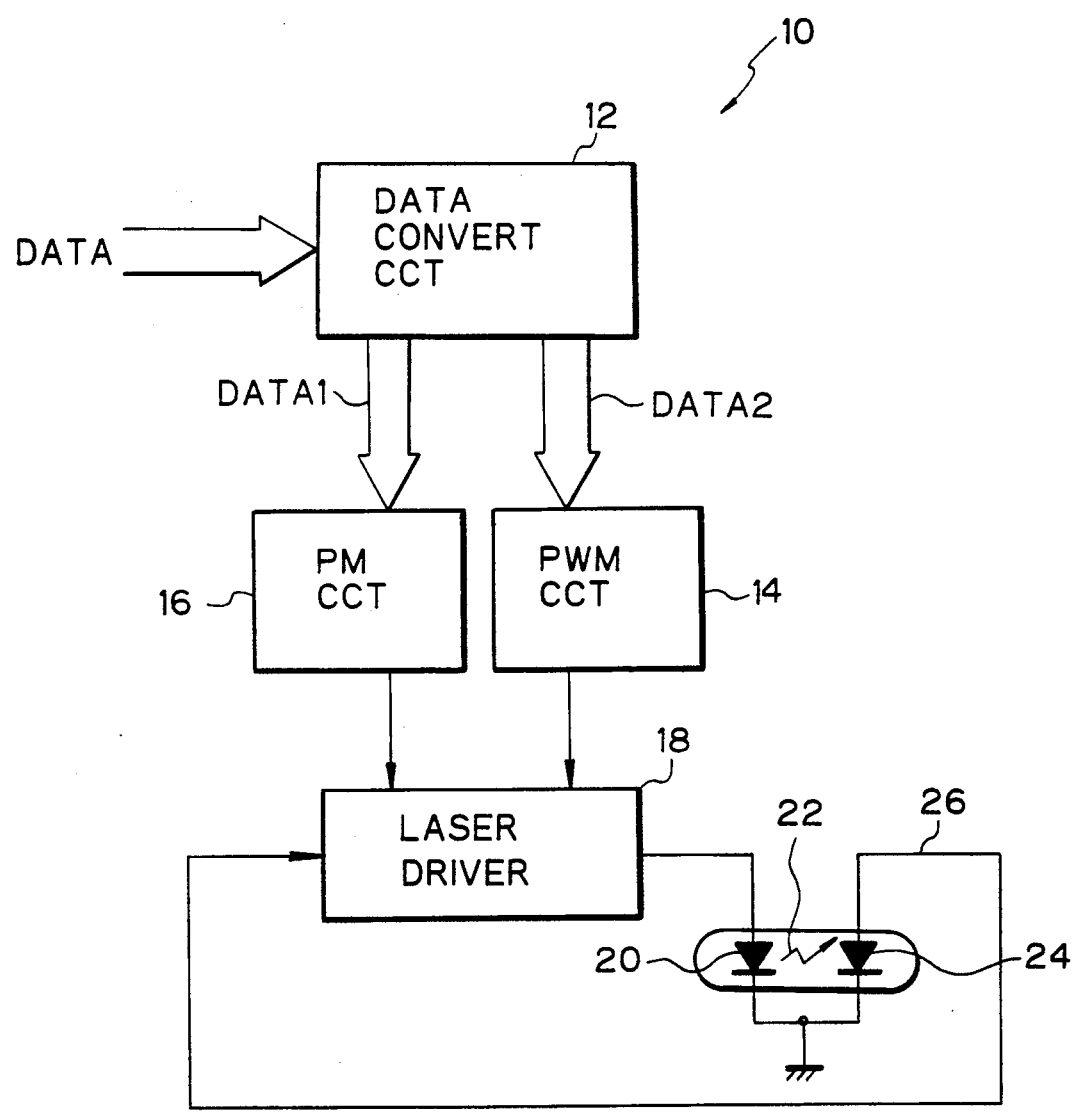
FIG. 1 is a block diagram schematically showing a control system of an image forming apparatus embodying the present invention and implemented as a laser beam printer by way of example.

Referring to FIG. 1 of the drawings, a control system representative of the illustrative embodiment is shown. The control system, generally 10, has an image data converting circuit 12 which receives image data DATA from a host machine. The converting circuit 12 separates the input image data into pulse width modulation data DATA1 representative of an emission pulse width and power modulation data DATA2 representative of an emission intensity. The data DATA1 and DATA2 are fed to a pulse width modulating (PWM) circuit 14 and a power modulating (PM) circuit 16, respectively. The resulting outputs of the modulating circuits 14 and 16 are applied to a laser driver 18 which drives a laser diode 20. The PWM circuit 14 controls the laser driver 18 to change the duration of a laser beam issuing from the laser diode 20, thereby changing the diameter of a dot as measured mainly in the main scanning direction. On the other hand, the PM circuit 16 controls the laser driver 18 to change the exposing energy per unit time and thereby the diameter of a dot mainly in the subscanning direction. A photodiode 24 receives the laser beam, or light output, 22 issuing from the laser diode 20 while feeding back an output 26 thereof to the laser driver 18. The output 26 of the photodiode 24 is used to control the light output 22 of the laser diode 24. The laser diode 20 is on-off controlled by the laser driver 18 on the basis of the image data DATA.

Figure 2:
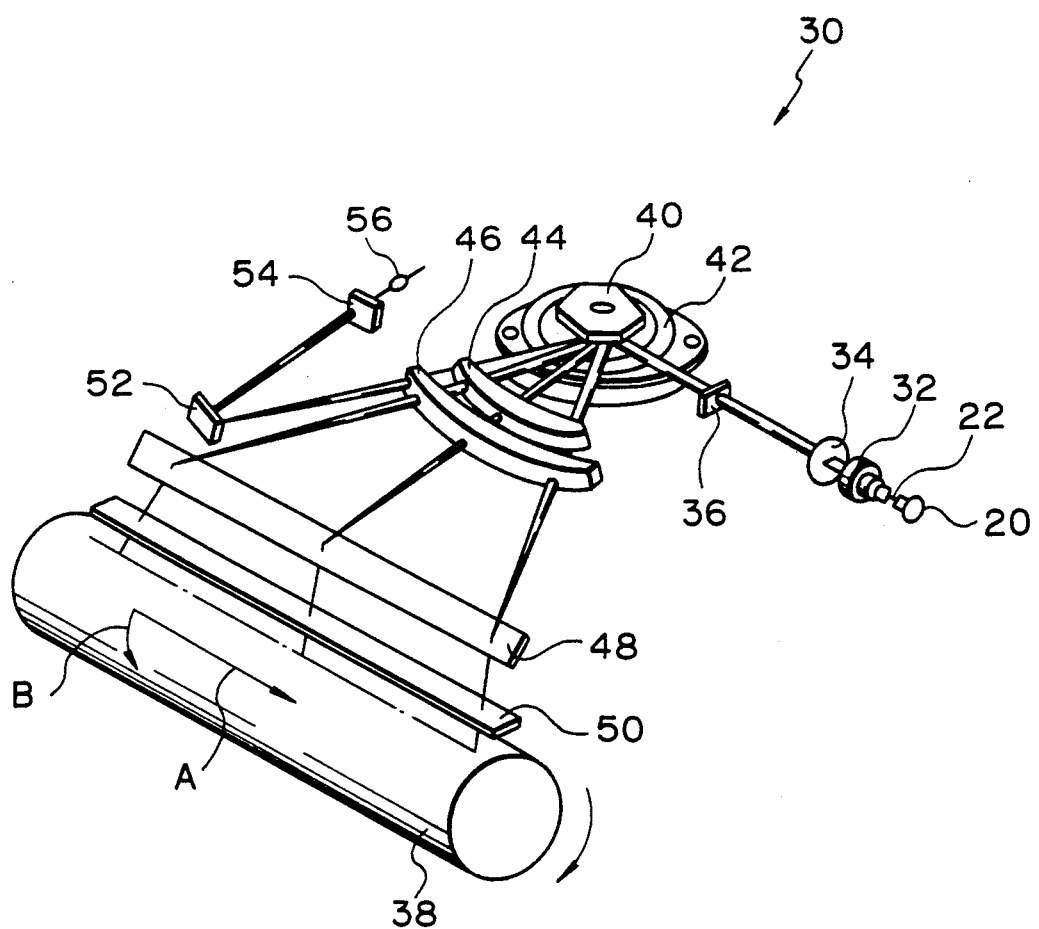
FIG. 2 is a perspective view of an optical writing device included in the illustrative embodiment.

FIG. 2 shows an optical writing device 30 incorporated in the laser beam printer for forming a latent image electrostatically on an image carrier which is implemented as a photoconductive element. As shown, the writing device 30 has a collimating lens 32 for transforming the laser beam 22 issuing from the laser diode 20 into parallel light. An aperture plate 34 has an aperture whose width matches the diameter of a dot to be formed and cuts a needless part of the parallel light. A cylindrical lens 36 converges the light beam of the main scanning direction onto a photoconductive drum 38 in a predetermined shape and size. A polygonal mirror 40 is rotated at a predetermined speed by a motor 42 to cause the converged beam to scan the drum 38 in the main scanning direction, as indicated by an arrow A in the figure. F-theta lenses 44 and 46 convert an equiangular motion into a uniform motion while correcting the curvature of the image plane. A mirror 48 reflects the light beam of the main scanning direction toward a cylindrical lens 50. In response, the cylindrical lens 50 converges the incident beam in the subscanning direction, as indicated by an arrow B. A mirror 52, a cylindrical lens 54 and a light-sensitive element 56 cooperate to establish synchronization in the subscanning direction A.

The operation of the control system 10 shown in FIG. 1 is as follows. The image data DATA fed from the host is distributed on a several dots basis to the PWM circuit 14 and PM circuit 16 as the pulse width modulation data DATA1 and power modulation data DATA2, respectively. This is to achieve tones, or different areas of a dot, with a single dot smoothly. In response to the data DATA1 and DATA2, the laser driver 18 adjusts the current being applied to the laser diode 20 such that the output 22 of the laser diode 20 matches the output level of the PM circuit 16. At the same time, the laser driver 18 feeds the current to the laser diode 20 over a particular period of time which is associated with the output data of the PWM circuit 14. The output 26 of the photodiode 24 which is proportional to the output 22 of the laser diode 20 is fed back to the laser driver 18, whereby the relation between the output of the PM circuit 16 and the laser output 22 is stabilized.

Figure 3:
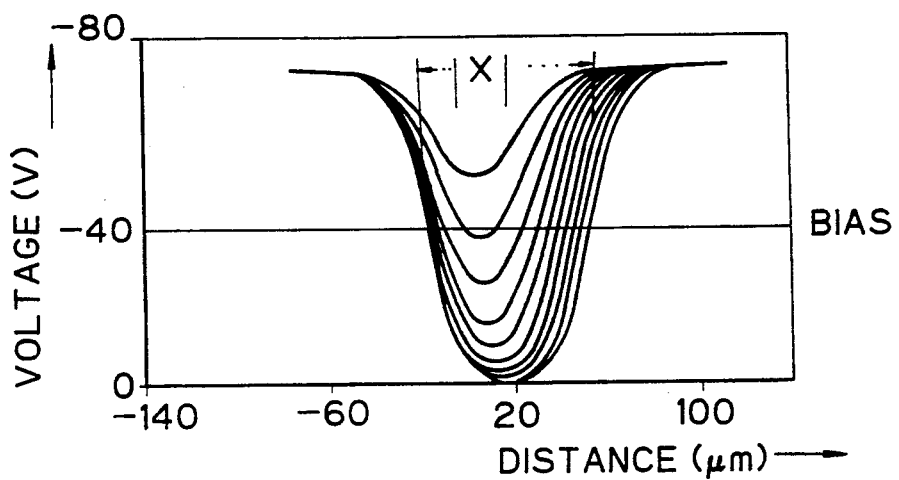
FIGS. 3 and 4 show respectively latent image characteristics resulted from the simulation of a latent image in the main and subscanning directions on a photoconductive drum and by changing the duration of a laser beam by a pulse width modulating circuit of FIG. 1.
Figure 4:
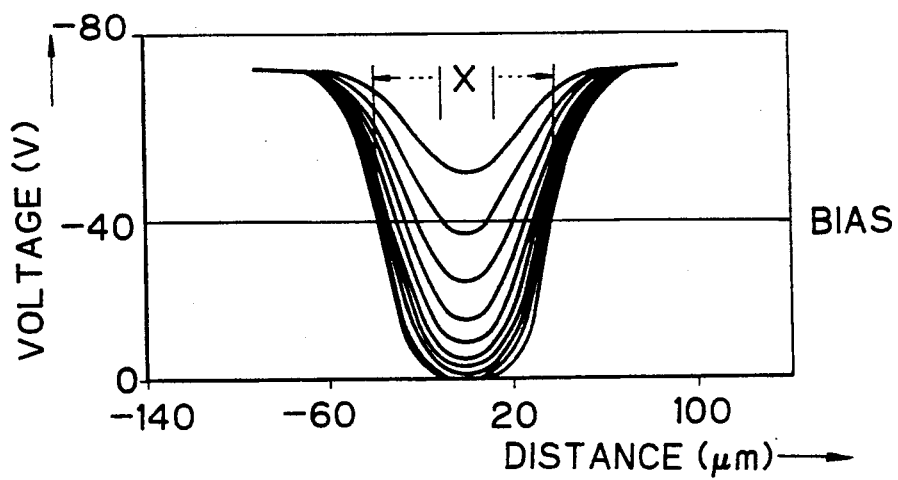
Figure 5:
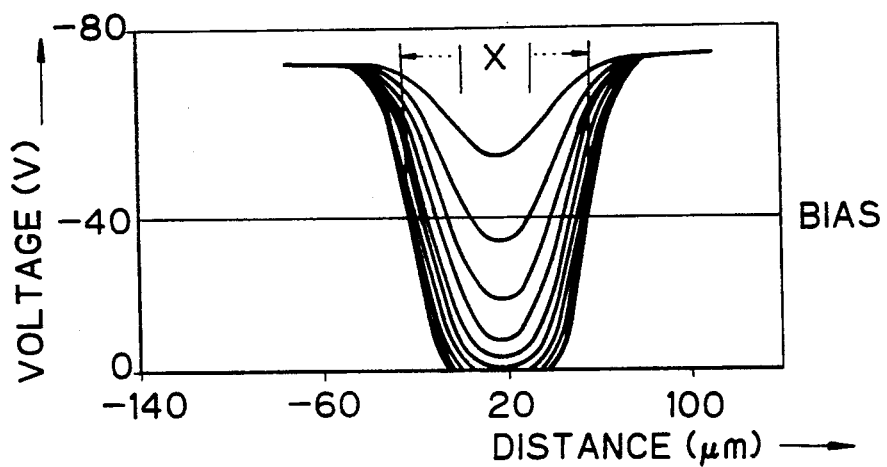
FIGS. 5 and 6 are views similar to FIGS. 3 and 4, showing respectively latent image characteristics in the main and subscanning directions determined by changing the intensity of a laser beam by a power modulating circuit of FIG. 1.
Figure 6:
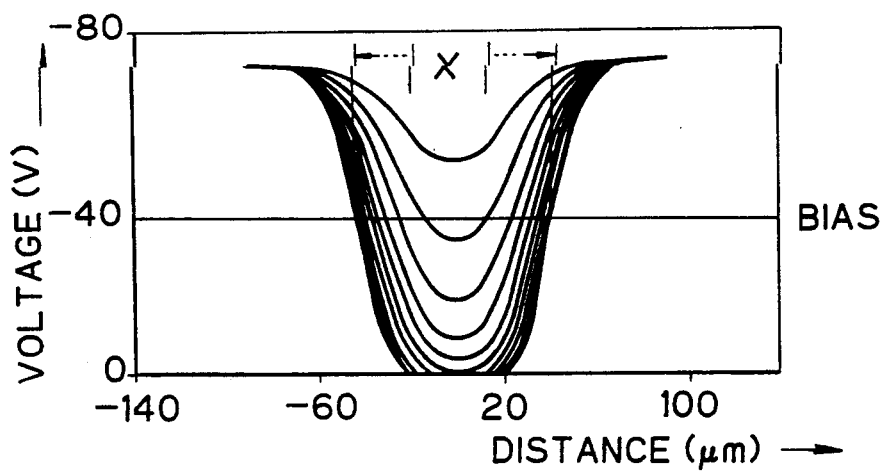

FIGS. 3 and 4 show respectively latent image characteristics representative of the results of simulation in the main and subscanning directions on the drum 38 which were obtained by changing the duration of the laser beam issuing from the laser diode 20 by the PWM circuit 14. Likewise, FIGS. 5 and 6 show respectively latent image characteristics representative of the results of simulation in the main and subscanning directions which were obtained by changing the intensity of the laser beam by the PM circuit 16. Specifically, the characteristics of FIGS. 3 and 4 were determined by changing the duration of the laser beam on a 5% basis from 5% to 50%, while the characteristics of FIGS. 5 and 6 were determined by changing the intensity of the laser beam on a 0.1 mW basis from 0.1 mW to 1.0 mW. In FIGS. 3 to 6, the horizontal center line is indicative of a voltage level or bias voltage BIAS of $-40$ V. The distance X between two points where each characteristic curve intersects the horizontal center line corresponds to the diameter of a latent image which can be developed. Hence, with the PWM circuit 14 and PM circuit 16, it is possible to change the diameter of a latent image in both of the main and subscanning directions. More specifically, when a latent image is developed, transferred to a medium, and then fixed on the medium, the diameter of a pixel or dot can be changed, especially enlarged, in the main and subscanning directions. While a dot having a greater area is attainable only with the PM circuit 16, the illustrative embodiment uses not only the PM circuit 16 but also the PWM circuit 14 taking account of the limited output available with the laser diode 20.

As stated earlier, the image data DATA representative of the size of a dot is divided by the data converting circuit 12, FIG. 1, into data DATA1 and DATA2, i.e., a emission pulse width and an emission intensity matching the size and shape of a dot. The PWM circuit 14 and PW circuit 16 drive the laser driver 18 on the basis of the combination of the data DATA1 and DATA2. To better understand the illustrative embodiment, assume that the emission pulse width has four levels and that the emission intensity has three levels.

Figure 7B:
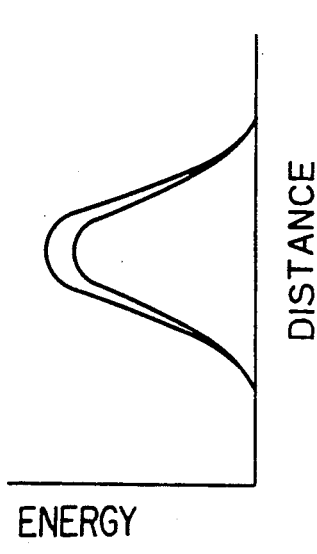
FIGS. 7A to 7D, 8A to 8D and 9A to 9D show the changes in the emission pulse width in the main scanning direction, the emission strength in the subscanning direction, and the surface potential of a photoconductive element determined by controlling the emission pulse width or pulse width modulation data and the emission intensity or power modulation data.
Figure 7A:
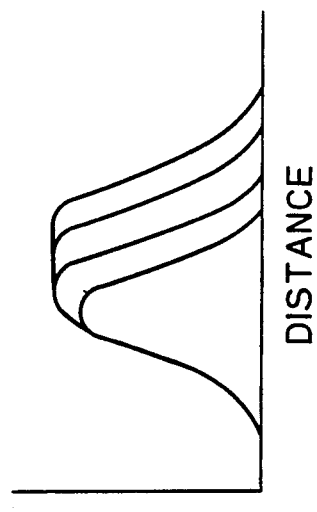
Figure 7D:
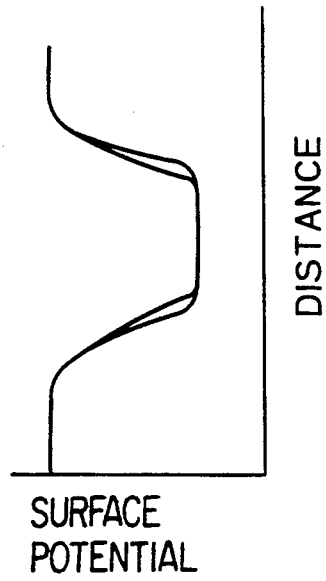
Figure 7C:
Figure 8A:
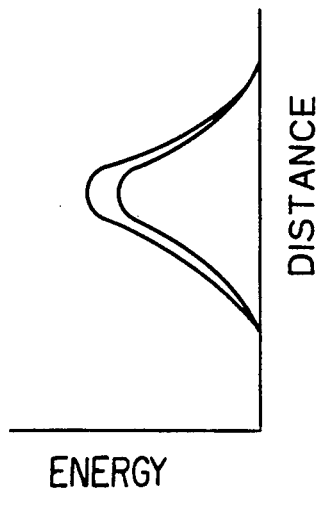
Figure 8B:
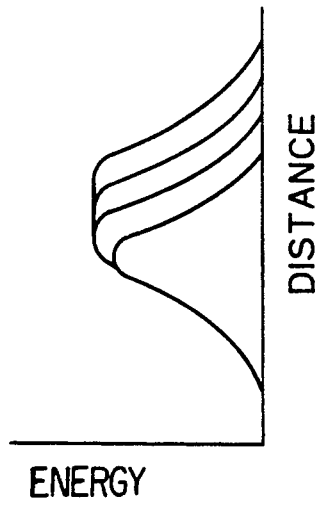
Figure 8C:
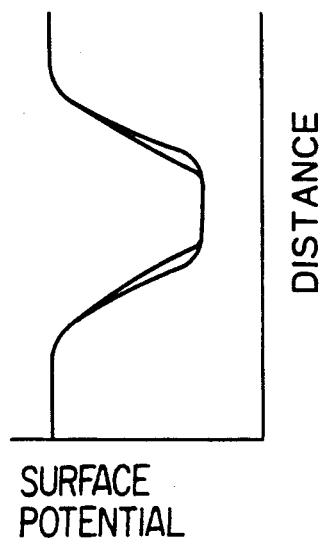
Figure 8D:
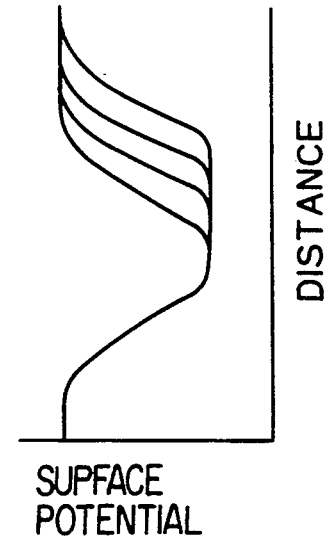
Figure 9A:
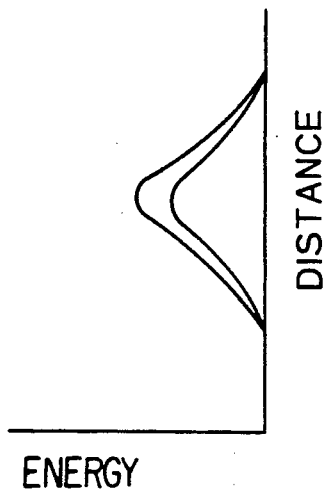
Figure 9B:
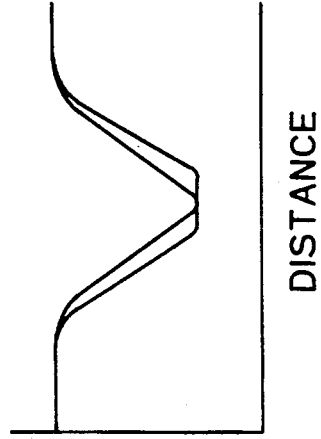
Figure 9C:
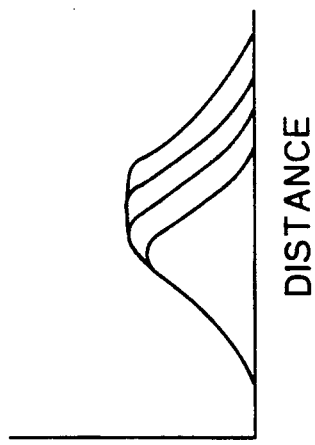
Figure 9D:
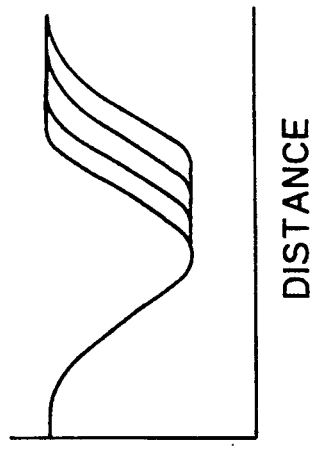

FIG. 7A shows an optical energy distribution particular to a condition wherein the emission intensity is constant and the emission pulse width selectively assumes any one of four consecutive levels. In FIG. 7A, the ordinate and abscissa are representative of the emission intensity and emission pulse width, respectively. As FIG. 7A indicates, the length of a dot as measured in the main scanning direction increases with the increase in the pulse width. FIG. 7B is associated with FIG. 7A and indicates an optical energy distribution in the subscanning direction; the dimension changes little in the subscanning direction. FIGS. 7C and 7D show surface potentials (ordinate) on the drum 38 which are respectively associated with the optical energy distributions of FIGS. 7A and 7B. As shown, the surface potential corresponds to the optical energy distribution. When the emission intensity is sequentially reduced compared to FIGS. 7A to 7D, the optical energy and the corresponding surface potential on the drum 38 change in the main and subscanning directions, as shown in FIGS. 8A to 8D and 9A to 9D.

Figure 10:
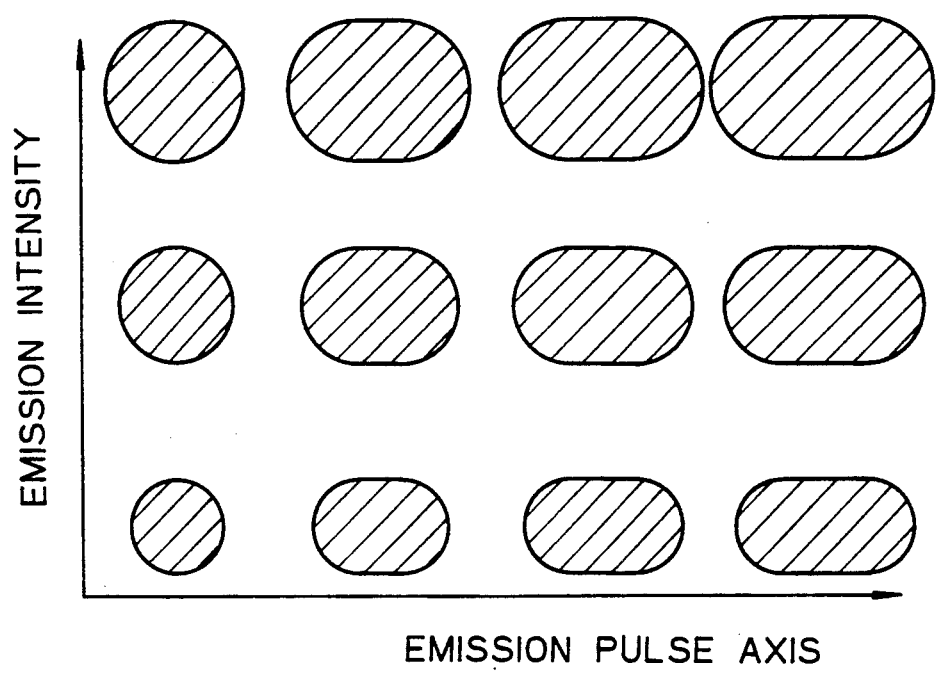
FIG. 10 is a view showing twelve different kinds of dots derived from the different conditions shown in FIGS. 7A to 7D, 8A to 8D, and 9A to 9D.
Figure 11:
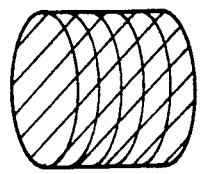
FIG. 11 is a vies showing dot diameters available with a conventional image forming apparatus.

FIG. 10 shows twelve (4×3) different dot images achievable width the above example, i.e., emission pulse width having four levels and emission intensity having three levels. As shown, the dot diameter noticeably changes in the main scanning direction when the emission pulse width is changed or in the subscanning direction when the emission intensity is changed. It has been customary to use only the PWM circuit 14 in rendering multiple tones by a single dot, as shown in FIG. 11. Such a conventional implementation, however, cannot change the dot diameter in the subscanning direction.

In summary, in accordance with the present invention, a data converting circuit separates input image data into pulse width modulation data and power modulation data and distributes them to a PWM circuit and a PM circuit. In response, the PWM circuit changes the duration of a laser beam issuing from a laser diode and thereby the diameter of a dot in the main scanning direction. At the same time, the PM circuit changes the exposing energy of the laser beam per unit area and unit time and thereby the dot diameter in the subscanning direction. This is successful in implementing various kinds of dots and, therefore, tones with high resolution. Especially, even when an image whose density is 600 dots per inch is to be formed by dots whose diameter is less than about 42 microns, dots each having a substantial diameter are attainable. Hence, a toner is allowed to deposit on a latent image stably at all times, insuring a high resolution image with tones. Further, since the diameter of a dot can be enlarged, the resulting image suffers little from the influence of banding which is ascribable to irregular writing in the subscanning direction.

Various modifications will become possible for those skilled in the art after receiving the teachings of the present disclosure without departing from the scope thereof.

What is claimed is:

1. An image forming apparatus capable of forming an image by dots having various diameters, comprising:

an image carrier for forming a latent image thereon;

optical writing means for scanning said image carrier with a light beam to form the latent image;

data converting means for separating image data fed thereto from the outside into first data and second data;

first changing means for generating, in response to said first data, a first output for changing the duration of the light beam issuing from said optical writing means and irradiating said image carrier in order to change a diameter of a dot mainly in a main scanning direction; and second changing means for generating, in response to said second data, a second output for changing an intensity of the light beam issuing from said optical writing means in order to change the diameter of a dot mainly in a subscanning direction;

wherein each combination of first data and second data generates a dot of a unique size, and each dot is generated based on first and second data independent of first and second data used to generate any other dot.

2. An apparatus as claimed in claim 1, wherein said optical writing means comprises a laser diode for emitting the light beam, and laser driving means for driving said laser diode in response to said first and second outputs.

3. An apparatus as claimed in claim 2, wherein said first and second data are respectively pulse width modulation data and power modulation data, said first and second varying means comprising respectively pulse width modulating means and power modulating means.

4. An apparatus as claimed in claim 3, wherein said first and second outputs enlarge the diameter of a dot in the main and subscanning directions.

5. An apparatus as claimed in claim 1, wherein the dot is provided with a greater diameter when forming a halftone image than when forming an ordinary image.

* * * * *